(12) United States Patent
Jahn

(10) Patent No.: US 8,320,008 B2
(45) Date of Patent: Nov. 27, 2012

(54) ESTABLISHING JOB TICKET VALUES OF A PRINT JOB IN A PRINT SHOP ARCHITECTURE

(75) Inventor: Janeen E. Jahn, Lafayette, CO (US)

(73) Assignee: Ricoh Company, Ltd, Tokyo (JP)

( * ) Notice: Subject to any disclaimer, the term of this patent is extended or adjusted under 35 U.S.C. 154(b) by 100 days.

(21) Appl. No.: 13/032,993

(22) Filed: Feb. 23, 2011

(65) Prior Publication Data

US 2012/0212775 A1 Aug. 23, 2012

(51) Int. Cl.
*G06F 3/12* (2006.01)
(52) U.S. Cl. ........................................ 358/1.15
(58) Field of Classification Search ............... 358/1.15
See application file for complete search history.

(56) References Cited

U.S. PATENT DOCUMENTS

2005/0030578 A1* 2/2005 Wiechers .................. 358/1.15
* cited by examiner

*Primary Examiner* — Marivelisse Santiago Cordero
*Assistant Examiner* — Eric A Rust
(74) *Attorney, Agent, or Firm* — Duft Bornsen & Fishman, LLP

(57) ABSTRACT

The systems and methods presented herein provide correction of job tickets by replacing impermissible missing values with default values or null values when needed. For example, certain components within a printing system described herein may determine whether a job ticket is allowed to have a missing value within one of the printing parameters. If not, the printing system replaces with missing value with a null value and a database of the printing system updates all other necessary components within the printing system (e.g., print server components, such as a printer object, a scheduler, etc.) with the updated job ticket.

13 Claims, 7 Drawing Sheets

ESTABLISHING JOB TICKET VALUES OF A PRINT JOB IN A PRINT SHOP ARCHITECTURE

FIELD OF THE INVENTION

The invention relates to processing print jobs though a print shop architecture.

BACKGROUND

Larger enterprises often employ fairly complex print shop architectures to address their various printing needs. For example, members of an organization may use local printers for simple desktop publishing (e.g., letters, memorandums, pictures, etc.). However, when the organization requires more sophisticated and/or larger volume printing, the organization may employ a print shop architecture comprising a number of higher-end printers (e.g., multifunction printers, production printing systems, etc.) that are capable of providing more functionality and/or print volume.

These print shop architectures are typically managed by a print server that is operable to receive print jobs from a plurality of clients via host system devices (e.g., networked computer systems, mobile devices, etc.). The seamless integration of the printers in such an environment, however, is often difficult to implement. For example, printers and their specific capabilities may not be fully recognized by individual client devices. The print server is configured to manage the hardware and software assets of the printers in the print shop architecture such that a user can easily identify a particular printer. In this centralized print environment, system administrators and other information technology personnel can also access and control the features of the printers.

Typically, the print server is configured with a plurality of features and protocols of the various printers controlled by the print server. For example, each printer managed by the print server may have its own print capabilities (e.g., double-sided printing, stapling, collation, etc.) and/or print protocols (Hot Folder, Job Definition Format or "JDF", Job Messaging Format or "JMF", line printer or "LPR"), that differ from other printers in the print shop architecture. Before such centralized management, a client device would install a printer driver that included the printing capabilities of the printer. The printer driver also establishes the print protocol for the client device to communicate with and control the printer. The print server maintains the printer drivers for the physical printer.

The print server presents this functionality to the client device such that a user may print a document to a particular physical printer. For example, when a user wishes to print a document to a particular physical printer, the user may communicate with the print server to access that physical printer. The client may then generate a print job using the various system capabilities that are presented by the print server. The client may then transfer the print job to the print server in a print datastream that includes the print job and a job ticket associated with the print job. For example, the print job may include one or more documents for printing while the job ticket provides various printing parameters that are used by the physical printer to print the print job. While some of these parameters may be incorporated within the print job itself, the job ticket may provide verification that a particular print job is printed properly. The print job and the job ticket are configured in a print datastream using a print protocol of the physical printer to which the print job is being sent. Examples of print datastreams include Portable Document Format (PDF), Mixed Object: Document Content Architecture (MO:DCA), Advanced Function Printing (AFP).

In some instances, a particular print datastream type allows a user to leave certain values missing within the job ticket. The printer in such a case simply inserts a null value in the job ticket and processes the print job without the value. A problem, however, exists when a print datastream does not allow missing values and the job ticket has a field with a missing value for a printing parameter. In such as case, the print shop architecture may attempt to process the print data stream providing variable interpretations of the missing value along the way to the physical printer. These variable interpretations of missing values may halt or slow printing at the physical printer until they can be resolved.

SUMMARY

Embodiments herein provide correcting edited job tickets by replacing impermissible missing values with default values when needed. For example, certain components within a printing system described herein may determine whether a job ticket is allowed to have a missing value within one of the printing parameters. If not, the missing value in the job ticket is replaced with a null value and a database subsequently updates all necessary components (e.g., print server components, such as a printer object, a scheduler, etc.) within the printing system with the corrected job ticket.

In one embodiment, a printing system includes a print process device that is operable to interface between a client system and a physical printer to process a print job and an associated job ticket in a print data stream from the client system for printing on the physical printer. The job ticket includes printing parameters operable to print one or more documents of the print job on the physical printer. The printing system includes a database operable to store the job ticket, to parse fields in the job ticket for updating at least one component of the printing system with the printing parameters, to identify a missing value in at least one of the fields of the job ticket, and to replace the missing value of the job ticket with a null value.

The printing system may also include a job ticket editor communicatively coupled to the database and operable to edit the job ticket during processing of the print job. The database, in this regard, is further operable to correct errors and/or update changes and deletions in the edited job ticket introduced via the job ticket editor. The printing system may also include a scheduler operable to schedule print jobs from a plurality of client systems in a queue. The database, in this regard, is further operable to update the scheduler with the edited job ticket. The database may be further operable to identify an improper value for a printing parameter in the job ticket and replace the improper value of the job ticket with a default value. The database may be further operable to determine the print data stream type to update the job ticket.

The various embodiments disclosed herein may be implemented in a variety of ways as a matter of design choice. For example, the embodiments may take the form of computer hardware, software, firmware, or combinations thereof. In one embodiment, a method is operable within the printing system to perform the functionality of establishing job ticket values throughout printing system in view of possible variable interpretations of job ticket values. In another embodiment, a computer readable medium is operable to store software instructions that are operable to implement the various steps in the method. Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
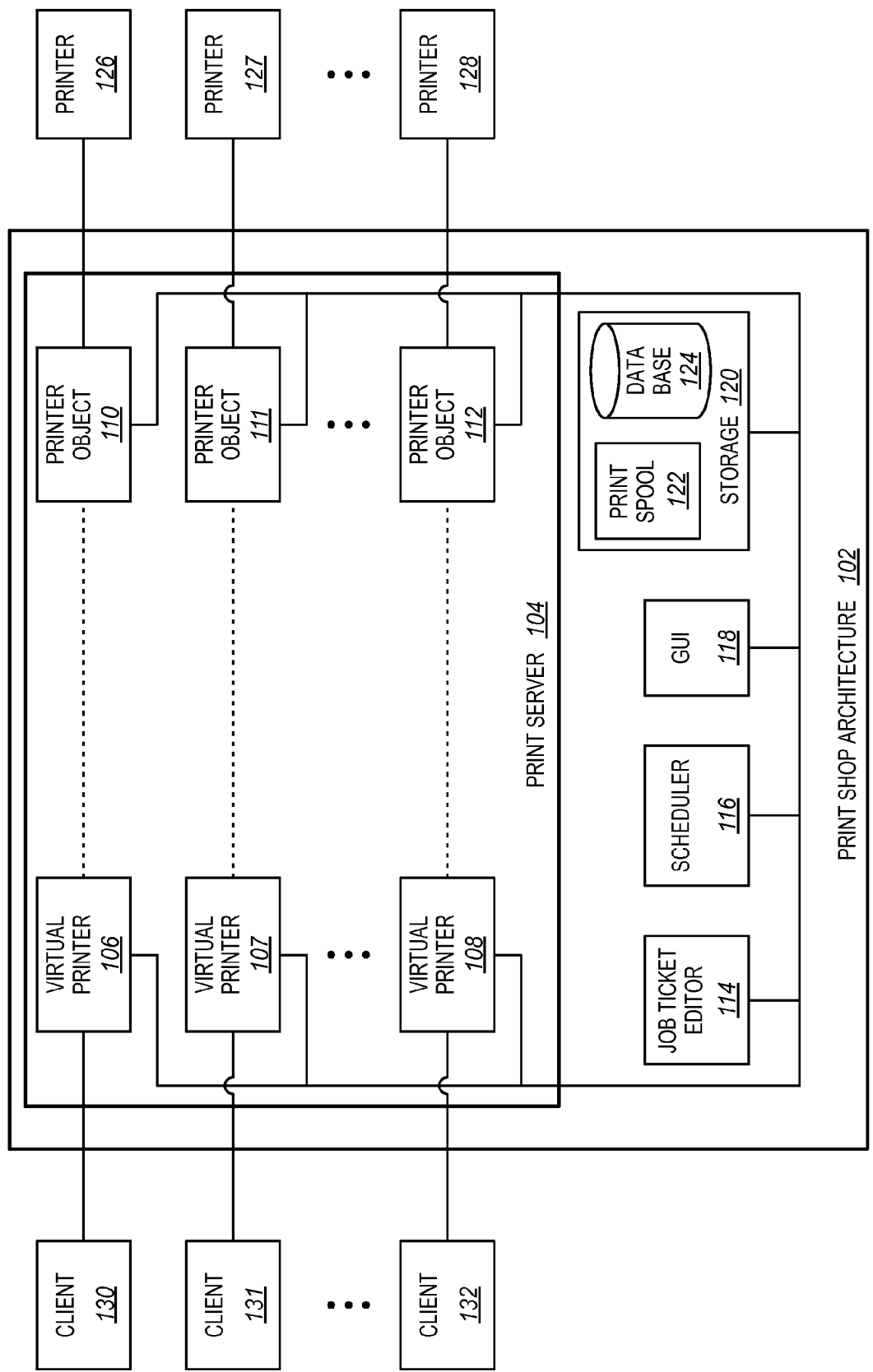
FIG. 1 is a block diagram of a print shop architecture in an exemplary embodiment.

FIG. 1 is a block diagram illustrating a print shop architecture 102 (also referred to herein as a printing system) in an exemplary embodiment. The print shop architecture 102 couples one or more clients 130-132 to one or more physical printers 126-128 to provide printing and print workflow services to the clients 130-132. The print shop architecture 102 is operable to receive print jobs and job tickets from the clients 130-132 for printing via printers 126-128. The clients 130-132 may include banks, credit card companies, or other entities that generate print jobs (e.g., monthly bank statements, monthly credit card bills, etc.) on host computer systems via software applications that interface with the print shop architecture 102. The print shop architecture 102 may receive the print jobs from the clients 130-132 in a number of different formats, such as Portable Document Format (PDF), Mixed Object: Document Content Architecture (MO:DCA), Advanced Function Printing (AFP), etc. Job tickets may be received from the clients 130-132 in a number of different formats, such as Job Definition Format (JDF), Print Production Format (PPF), Portable Job Ticket Format (PJTF), etc. A job ticket comprises print parameters that define how a print job is to be printed on the printers 126-128. The printers 126-128 generally include systems for transforming print data of the print jobs onto a suitable printable medium, such as paper, and generally are large production printing systems for high volume printing.

The print shop architecture 102 includes a print server 104 (also referred to herein as a print process device) having one or more virtual printers 106-108. The virtual printers 106-108 are generally software modules that are operable within the print server 104 to communicate with the clients 130-132 and provide an interface to the clients 130-132 that allows the clients 130-132 to set up print jobs and send the print jobs (and job tickets associated with the print jobs) to the printers 126-128. The print shop architecture 102 also includes a corresponding plurality of printer objects 110-112. The printer objects 110-112 are similar to printer drivers in that the printer objects 110-112 comprise print capabilities of corresponding printers 126-128. The printer objects 110-112 also include system capabilities of the print shop architecture 102 (i.e., delayed printing features, expedited printing features, periodic printing features, etc.). Accordingly, each printer object generally includes all of the printing capabilities of a printer and establishes the communications and control for that printer. Typically, a 1:1:1 correspondence exists between the virtual printers, the printer objects, and the printers. That is, a virtual printer typically interfaces to one printer object and that printer object comprises the printing capabilities of one printer.

When the clients 130-132 send print jobs and job tickets to the print shop architecture 102, the job tickets are copied into a database 124 located in storage 120 of the print shop architecture 102. The print jobs are then placed in a print spool 122 of storage 120 as open print jobs prior to queuing the print jobs for printing. A scheduler 116 identifies the open print jobs located in the print spool 122 and attempts to schedule the print jobs in queues of the printer objects 110-112. Typically, the scheduler 116 attempts to schedule the open print jobs with one of the printer objects 110-112 corresponding to the virtual printer that received the print job. For example, if the client 130 transmitted the print job to the virtual printer 106, then the scheduler 116 may first attempt to place the print job in a print queue of the print server object 110. Generally, the printer objects 110-112 interface with corresponding printers 126-128 to queue and process print jobs prior to transmitting the print jobs to the printers 126-128.

A print operator may use a Graphical User Interface (GUI) of the print shop architecture 102 to control and identify the status of print jobs in the print shop architecture 102. For example, the GUI 118 may provide a list of print jobs in queues of the printer objects 110-112 and other general information about the status of open jobs in the print spool 122. The print operator may also use a job ticket editor 114 to modify job tickets associated with both open and queued print jobs. By using the job ticket editor 114, the print operator may modify job tickets to change various print options for a print job associated with the job ticket, such as duplexing, stapling, media type, etc. The print shop architecture 102 provides a number of printing and workflow services to the clients 130-132 which will become more readily apparent through the following discussion and related figures.

Although shown and described with respect to a particular number of clients, virtual printers, printers, and printer objects, the invention is not intended to be so limited. The print server 104 may be operable to provide printing services to more or fewer clients and/or include more or fewer printers than shown in the exemplary embodiment. Moreover, each virtual printer may be operable to provide an interface to printing services for more than one client.

Figure 2:
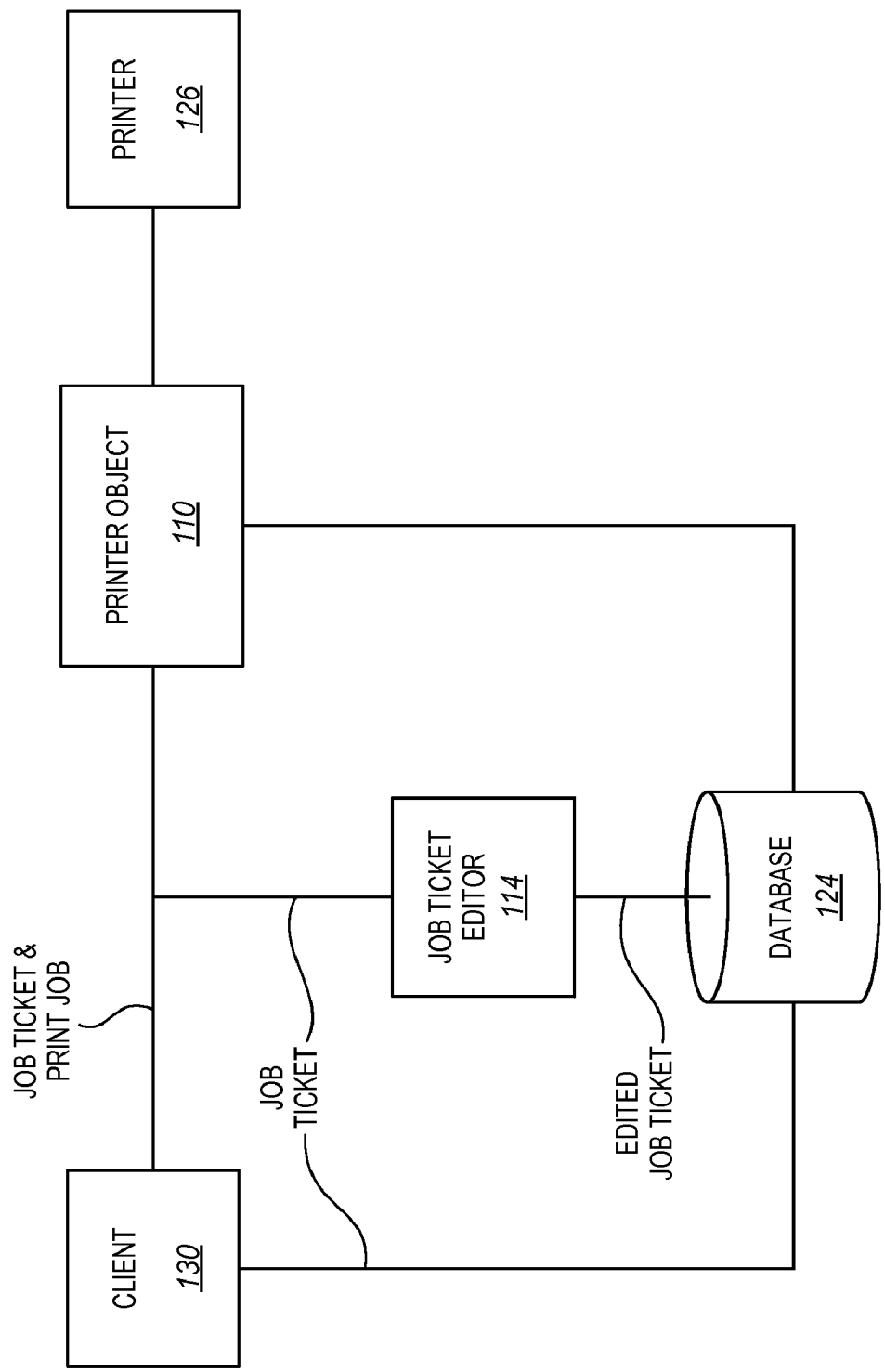
FIG. 2 is a block diagram of a job ticket editor interacting with a database in the print shop architecture in an exemplary embodiment.
Figure 3:
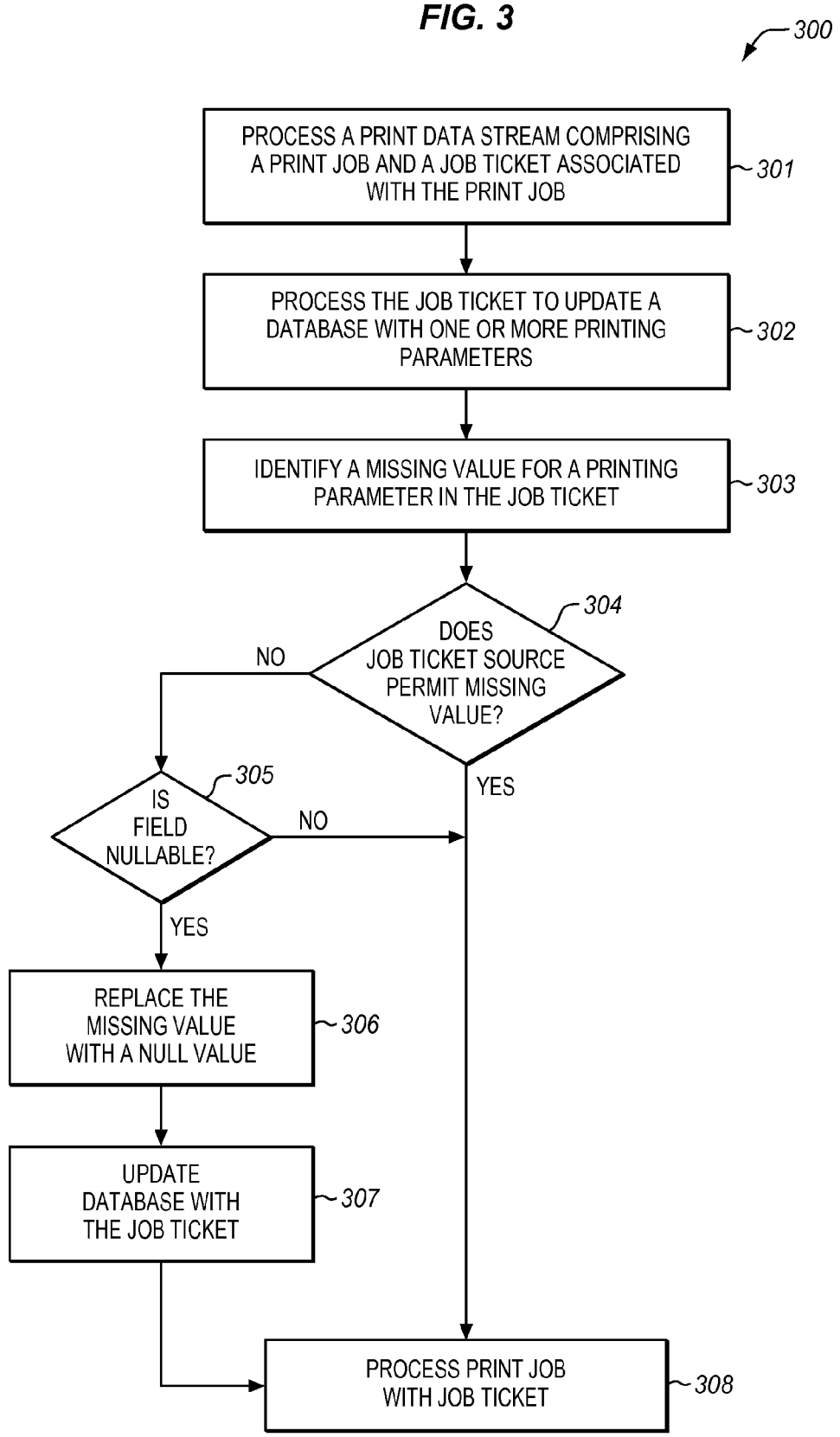
FIG. 3 is a flow chart of a method for processing edits to a job ticket in an exemplary embodiment.

FIG. 2 is a block diagram of a job ticket editor 114 interacting with the database 124 in the print shop architecture 102 in an exemplary embodiment. In this embodiment, the client 130 transfers a print datastream including a print job and a job ticket to the print shop architecture for printing to the physical printer 126. The print datastream may be transferred to the print shop architecture 102 via a print protocol of the printer 126. Examples of various print protocols include HotFolder, LPR, JMF, and JDF. HotFolder provides a relatively quick way of sending image files to the printers 126-128. The Hot-Folder interface displays the printers 126-128 to the clients 130-132 through user created "hot folders" that serve as drop-off points for images where printing is desired. LPR is a well-known network protocol for submitting print jobs to a remote printer. JDF is an extensible XML-based protocol built upon existing technologies of the International Cooperation for the Integration of Processes in Prepress, Press, and Postpress Organization (CIP4) Print Production Format and the Adobe Portable Job Ticket Format. JDF provides the ability to unify print aspects of print jobs and bridge communication between printers and management functionality, regardless of the tools being used. JDF works in tandem with a counterpart format, JMF. JMF provides for production components of a JDF workflow to communicate management functionality. JMF provides a series of queries and commands to elicit information about JDF print jobs and determine system capabilities of the print server 104 and/or printer capabilities of the printers 126-128. The functionality of the print shop architecture 102 will now be discussed with reference to the method 300 of FIG. 3.

The method 300 initiates after the client 130 transfers the print job and the job ticket to the print shop architecture 102 via the print protocol of the printer 126. Thereafter, the print shop architecture 102 initiates processing of the print job, in the process element 301 (e.g., identifying various printing parameters, preparing the documents of the print job for printing, etc.) such that the print job may be printed via the physical printer 126. In doing so, the print server 104 may detect the type of print datastream (e.g., AFP, MO:DCA, PDF, etc.) and/or the job ticket source (e.g., Hot Folder, the job ticket editor 114, etc.) via the virtual printer 106. The print server 104 processes the job ticket to update the database 124 with the printing parameters therein, in the process element 302, such that the database 144 may ensure that components of the print shop architecture 102 (e.g., the printer object 110, the scheduler 116, etc.) have current printing parameters for printing the print job.

First, however, the database 124 parses the job ticket to identify any missing values for printing parameters in the job ticket, in the process element 303. If the database 124 identifies a missing value for a printing parameter in the job ticket, the database 124 may then determine whether the print datastream type and/or the job ticket source permits missing values within the job ticket, in the process element 304. For example, a print job may be created with a default value for its "retain time" (e.g., 3 days so as to limit the retention of the print job by the print server 104 for 3 days). When a job ticket is initially received through a HotFolder, and its retain time field is null, the database 124 is not updated to show a zero retain time. Alternatively, when a job ticket is received after being edited by the job ticket editor 114 with a retain time field being set to null, the database is updated to show a zero retain time, thereby indicating that a user set the retain time to blank using the job ticket editor 114.

Thus, if the job ticket source permits missing values in a job ticket, the print server 104 may simply process the print job with job ticket as is, in the process element 308. If not, the database 124 may then determine whether a particular field in the job ticket is "nullable", in the process element 305. For example, a print job may be generated with a default value for its input print datastream field (e.g., PDF); but, that particular field may not be nullable. Thus, when a job ticket is initially received through a HotFolder, and the print datastream field is set to null, the database 124 is not updated to show a null input print datastream. Similarly, when a job ticket is received after being edited by the job ticket editor 114 and the print datastream field is set to null, the database 124 is also not be updated. That is, the job ticket editor 114 does not allow a user to select the input print datastream so the user cannot indicate a value to be reset in the database. Accordingly, if the database 124 determines that the field in the job ticket is not nullable, the print server 104 processes the print job with job ticket as is, in the process element 308. If the field is nullable, the database 124 replaces the missing value with a null value, in the process element 306. An example of such missing value replacement is shown and described in further detail in FIGS. 4A-C.

Thereafter, the database 124 is updated with the job ticket so as to update the various components of the print shop architecture 102 requiring job ticket information, in the process element 307. For example, the print job of the client 130 may have already been inserted into a queue of the printer 126 by the scheduler 116. The database 124 may update the scheduler 116 such that the queue has the corrected information of the job ticket. Similarly, the database 124 may update the printer object 110 with the corrected information of the job ticket to ensure that the correct printing parameters are input to the printer 126 when the print job is printed. The print server 104 then processes the print job with the job ticket, in the process element 308.

In one embodiment, the database 124 may insert a permissible default value into the missing value of the job ticket (i.e., as permitted by the particular print datastream). Once the components of the print shop architecture 102 have been updated with the job ticket, the print server 104 may continue processing the print job with the job ticket information, in the process element 307. For example, once the printer object 110 receives the job ticket information, the printer object 110 may transfer the print job to the printer 126 via the print protocol of the printer 126.

Figure 4A:
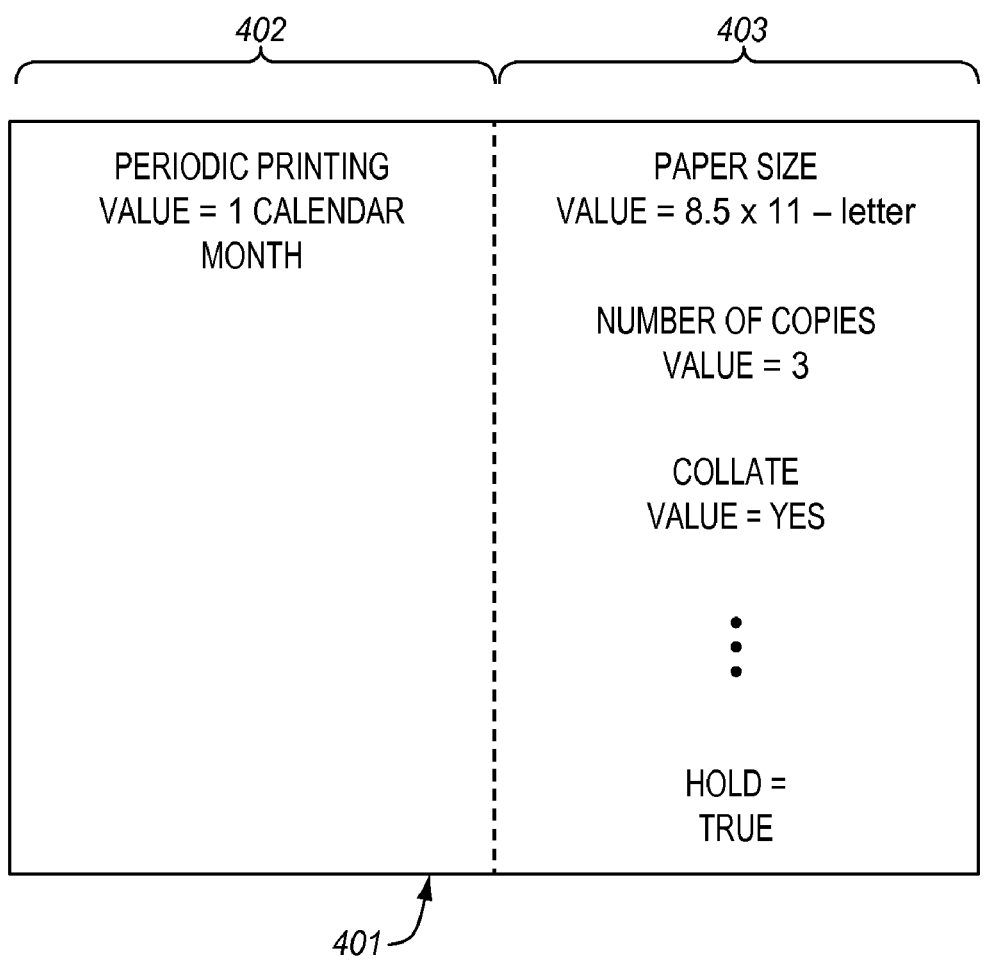
FIGS. 4A-4C illustrate job tickets of the print job in an exemplary embodiment.
Figure 4B:
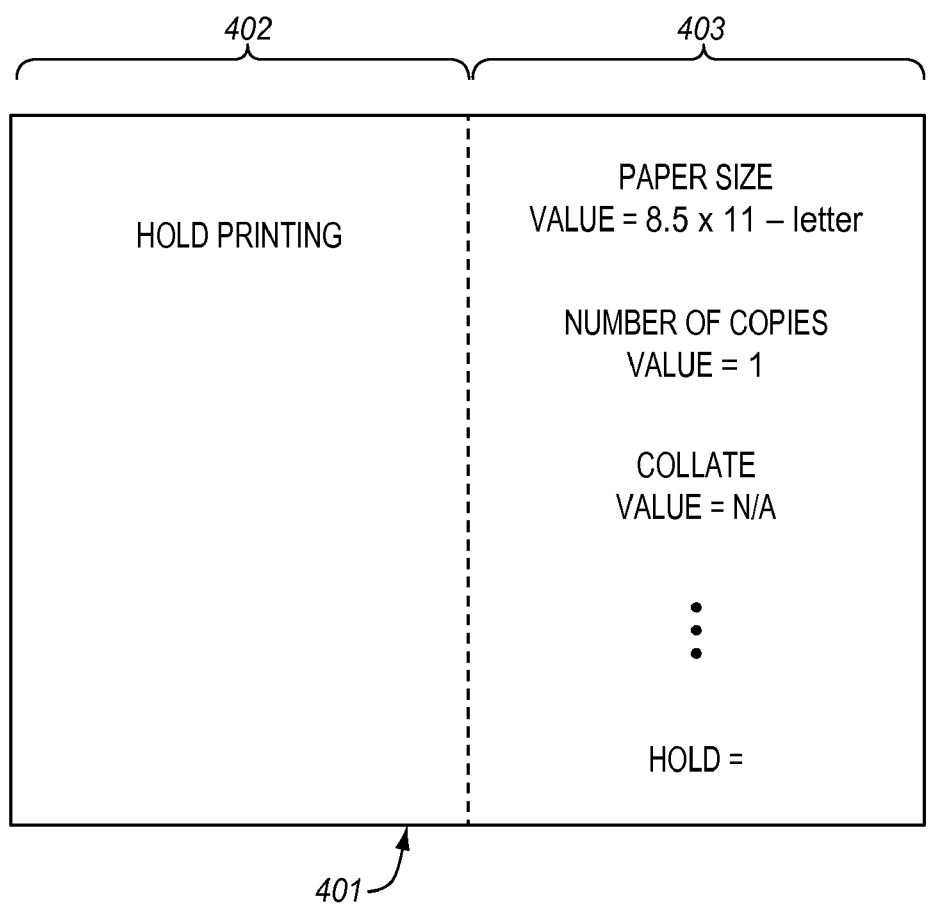
Figure 4C:
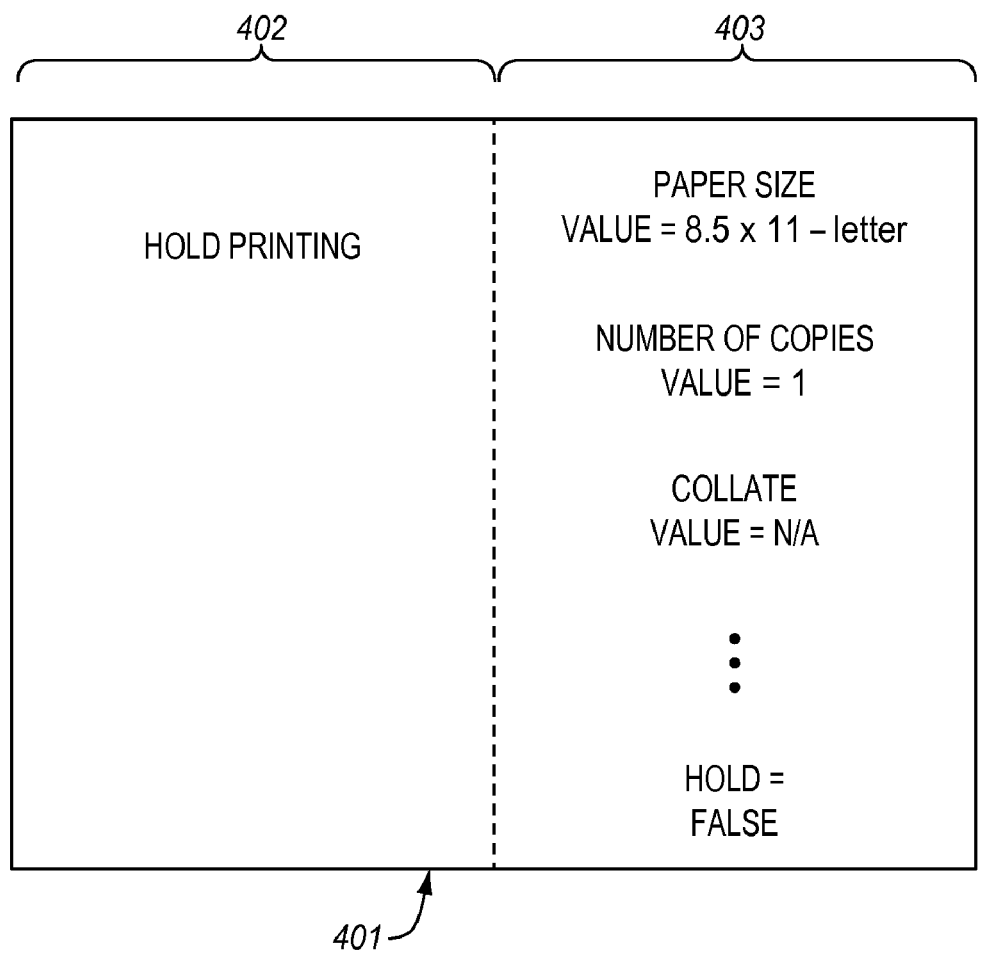

While missing values may be introduced by various components within the printing process (e.g., client systems 130-132) errors and/or deletions can be introduced into the job ticket via job ticket editing. For example, a change may be made to a print job during processing. This edit may include changing certain printing parameters within the job ticket which requires a corresponding edit to the job ticket. FIGS. 4A-4C illustrate job tickets 401 of the print job having certain errors/deletions introduced via the job ticket editor 114, in an exemplary embodiment. In this regard, FIG. 4A illustrates a job ticket 401 prior to editing by the job ticket editor 114, FIG. 4B illustrates the job ticket 401 with a missing value, and FIG. 4C illustrates a correction to the edited job ticket 401 by the database 124 in response to detecting an impermissible missing value. Certain values within the job ticket of an input print datastream are not allowed to be missing. Generally, the "HOLD" field of the job ticket 401 is one such example, as it determines whether a print job is to be held up or delayed.

As can be seen in FIG. 4A, the job ticket from the client 130 includes certain systems capabilities 402 of the print server 104, such as periodic printing, and certain printing capabilities 403, such as paper size, number of copies, collate copies, and the above mentioned HOLD field, of the printer 126. Once a decision has been made to edit the job ticket, a user accesses the job ticket editor 114 and edits these parameters as desired. FIG. 4B illustrates such with the periodic printing value of one calendar month being changed to hold printing of the print job (e.g., temporarily stop processing of the print job) in the system capabilities 402. The number of copies is also illustrated as being changed from three copies to one copy in the printing capabilities 403. Thus, collating is no longer applicable. If the collating value is not changed to N/A or otherwise prevented, that value may slow or halt processing of the print job through the print shop architecture 102. The HOLD field value, however, was deleted with the job ticket editor 114, which is not permissible. The database 124 is operable to determine this impermissible missing value and retrieve a default value for the edited job ticket as can be seen in FIG. 4C. In FIG. 4C the database 124 replaces the missing value with FALSE, an acceptable value.

Although shown and described with respect to one particular example of an impermissible missing value, the invention is not intended to be so limited. For example, certain print datastream types may require the number of copies, paper size, etc. be configured with the job ticket. The database 124 may be operable to replace these impermissible missing values on a print datastream by print datastream basis. That is, the job ticket editor 114 may determine the print datastream type of the job ticket to determine whether certain missing values within the job ticket are permissible for processing with a particular printer. If missing values are permissible, the database 124 may simply replace the value with a permissible null value in the job ticket and allow processing to continue. If the missing values are impermissible, the database 124 may replace those missing values with values that are permissible. Such may be implemented as a matter of design choice. For example, the database 124 may be configured to input values that would be typically desired in a print job of a particular print datastream type. However, the invention is not intended to be limited to any particular default value.

Additionally, while the embodiment of FIG. 2 is shown and described respect to a particular printer 126 and a printer object 110 within the print shop architecture 102, the invention is not intended to be limited to the exemplary embodiment. Rather, the database 124 may be operable to replace impermissible missing values within edited job tickets for virtually any of the print jobs received by the print server 102. Moreover, the database 124 may be operable to replace impermissible missing values of job tickets that are not edited. For example, if the client 130 generates a print job with a job ticket using older legacy software, the generated print job may have an associated job ticket that is automatically configured with impermissible missing values. Accordingly, the database 124 may also replace these with default values. In either case, the database 124 is operable to update the various components within the print shop architecture 102 to assure that the print job is properly processed to its requested printer.

Figure 5:
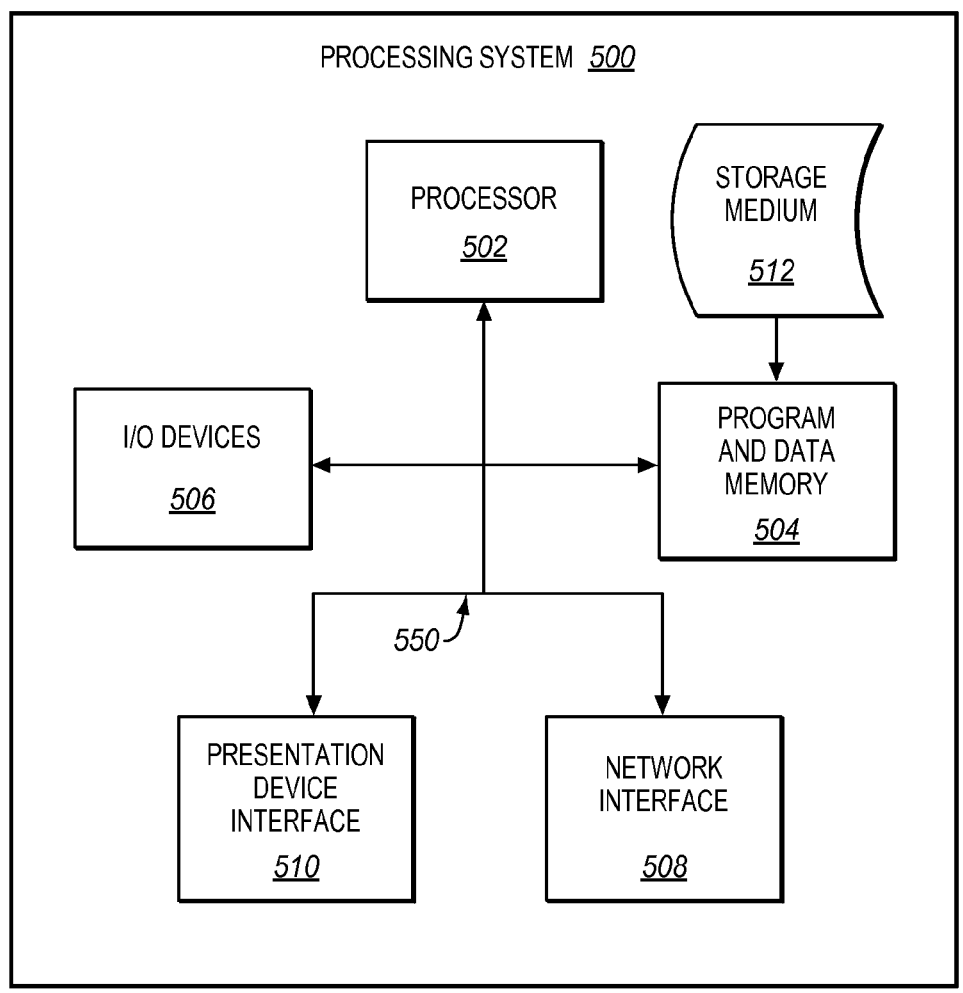
FIG. 5 illustrates an exemplary computer system operable to execute computer readable medium embodying programmed instructions to perform desired functions.

As mentioned, embodiments disclosed herein can take the form of software, hardware, firmware, or various combinations thereof. FIG. 5 is a block diagram depicting a processing system 500 also operable to provide the above features by executing programmed instructions and accessing data stored on a computer readable storage medium 512. In this regard, embodiments of the invention can take the form of a computer program accessible via the computer-readable medium 512 providing program code for use by a computer or any other instruction execution system. For the purposes of this description, the computer readable storage medium 512 can be anything that can contain, store, communicate, or transport the program for use by the computer.

The computer readable storage medium 512 can be an electronic, magnetic, optical, electromagnetic, infrared, or semiconductor device. Examples of the computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A processing system 500, being suitable for storing and/or executing the program code, includes at least one processor 502 coupled to memory elements 504 through a system bus 550. The memory elements 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc) can be coupled to the system either directly or through intervening I/O controllers. Network adapter interfaces 508 may also be coupled to the system to enable computer system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. A presentation device interface 510 may be coupled to the system to interface to one or more presentation devices, such as printing systems and displays for presentation of presentation data generated by processor 502.

Although shown and described with respect to automated processing of print job documents, such designations are merely intended to describe the general printing, sorting, and/or inserting of the documents. Accordingly, while specific embodiments are described herein, the scope of the invention is not limited to those specific embodiments. The scope of the invention is defined by the following claims and any equivalents thereof.

I claim:

1. A printing system, comprising:
a print process device operable to interface between a client system and a physical printer to process a print job and an associated job ticket in a print data stream from the client system for printing on the physical printer,
wherein the job ticket comprises printing parameters operable to print one or more documents of the print job on the physical printer;
wherein the print process device comprises:
a database operable to store the job ticket, and to parse fields in the job ticket for updating at least one component of the printing system with the printing parameters, to identify a missing value in at least one of the fields of the job ticket, and to replace the missing value of the job ticket with a null value;
a job ticket editor communicatively coupled to the database and operable to edit the job ticket during processing of the print job;
the database further operable to identify a missing value of a printing parameter in the edited job ticket, to determine whether the missing value within the edited job ticket is permissible with the print data stream, to replace the missing value with a default value to update the edited job ticket in response to determining that the missing value in the edited job ticket is impermissible for the print data stream, and to update the stored job ticket with the edited job ticket.

2. The printing system of claim 1 wherein the database is further operable to correct errors and deletions in the edited job ticket introduced via the job ticket editor.

3. The printing system of claim 1, further comprising a scheduler operable to schedule print jobs from a plurality of client systems in a queue,
wherein the database is further operable to update the scheduler with the edited job ticket.

4. The printing system of claim 1, wherein the database is further operable to identify an improper value for a printing parameter in the job ticket and replace the improper value of the job ticket with a default value.

5. The printing system of claim 1, wherein the database is further operable to determine the print data stream type to update the job ticket.

6. A method operable in a printing system, the method comprising:
- processing a print data stream for printing, wherein the print data stream comprises a print job and a job ticket associated with the print job and wherein the job ticket comprises printing parameters operable to print one or more documents on a physical printer;
- processing the job ticket to update a database with one or more of the printing parameters of the job ticket;
- identifying a missing value for a printing parameter in the job ticket;
- replacing the missing value with a null value;
- updating the database with the updated job ticket;
- processing an edit to the job ticket;
- identifying a missing value of a printing parameter in the edited job ticket;
- determining whether the missing value within the edited job ticket is permissible with the print data stream;
- replacing the missing value with a default value responsive to determining that the missing value in the edited job ticket is impermissible for the print data stream to update the edited job ticket; and
- updating the database with the updated edited job ticket.

7. The method of claim 6, further comprising:
- retrieving the default value from the database in response to determining that the missing value in the edited job ticket is impermissible for the print data stream,
- wherein the database is operable to update at least one component in the printing system with the updated edited job ticket.

8. The method of claim 6, further comprising:
- identifying an improper value for a printing parameter in the job ticket;
- retrieving a default value from the database;
- replacing the improper value with the default value to update the job ticket; and
- updating the database with the updated job ticket.

9. The method of claim 6, further comprising updating the print job in a queue of print jobs from a plurality of client systems with the updated job ticket.

10. A non-transitory computer readable medium comprising software instructions that, when executed on a processor, are operable to direct the processor to process a print job from a client system in a printing system, the software instructions being further operable to direct the processor to:
- process a print data stream for printing, wherein the print data stream comprises a print job and a job ticket associated with the print job and wherein the job ticket comprises printing parameters operable to print one or more documents on a physical printer;
- process the job ticket to update a database with one or more of the printing parameters of the job ticket;
- identify a missing value for a printing parameter in the job ticket;
- replace the missing value with a null value; and
- update the database with the updated job ticket;
- process an edit to the job ticket;
- identify a missing value of a printing parameter in the edited job ticket;
- determine whether the missing value within the edited job ticket is permissible with the print data stream;
- replace the missing value with a default value responsive to determining that the missing value in the edited job ticket is impermissible for the print data stream to update the edited job ticket; and
- update the database with the updated edited job ticket.

11. The non-transitory computer readable medium of claim 10, wherein the software instructions are further operable to:
- retrieve the default value from the database in response to determining that the missing value in the edited job ticket is impermissible for the print data stream,
- wherein the database is operable to update at least one component in the printing system with the updated edited job ticket.

12. The non-transitory computer readable medium of claim 10, wherein the software instructions are further operable to:
- identify an improper value for a printing parameter in the job ticket;
- retrieve a default value from the database;
- replace the improper value with the default value to update the job ticket; and
- update the database with the updated job ticket.

13. The non-transitory computer readable medium of claim 10, wherein the software instructions are further operable to update the print job in a queue of print jobs from a plurality of client systems with the updated job ticket.

* * * * *